(12) United States Patent
Totappanavar et al.

(10) Patent No.: US 10,855,553 B2
(45) Date of Patent: Dec. 1, 2020

(54) VISUALIZATION OF NEW STORAGE AREA NETWORK DEVICES AND CONNECTIVITY WITH A TOPOLOGY BASED MAP

(71) Applicant: EMC IP Holding Company LLC, Hopkinton, MA (US)

(72) Inventors: Vineeth Totappanavar, Bangalore (IN); Dilip Shanmugham, Bangalore (IN); Smitha Tengle, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 16/249,222

(22) Filed: Jan. 16, 2019

(65) Prior Publication Data

US 2020/0228416 A1 Jul. 16, 2020

(51) Int. Cl.
| | |
|---|---|
| *H04L 12/24* | (2006.01) |
| *G06F 3/0486* | (2013.01) |
| *G06F 16/23* | (2019.01) |
| *G06F 16/248* | (2019.01) |
| *G06F 3/0482* | (2013.01) |

(52) U.S. Cl.
CPC ............ *H04L 41/22* (2013.01); *G06F 3/0482* (2013.01); *G06F 3/0486* (2013.01); *G06F 16/2365* (2019.01); *G06F 16/248* (2019.01)

(58) Field of Classification Search
CPC ... H04L 41/22; G06F 16/2365; G06F 16/248; G06F 3/0486; G06F 3/0482
See application file for complete search history.

(56) References Cited

U.S. PATENT DOCUMENTS

| | | | | |
|---|---|---|---|---|
| 7,450,505 | B2 * | 11/2008 | Buchanan | ........... H04L 12/4641 370/231 |
| 7,519,917 | B2 * | 4/2009 | Lewis-Bowen | ....... G06F 3/0482 715/772 |
| 2010/0074141 | A1 * | 3/2010 | Nguyen | .................. H04L 41/12 370/254 |
| 2010/0100767 | A1 * | 4/2010 | Liu | ..................... H04L 41/0806 714/28 |

(Continued)

OTHER PUBLICATIONS

"Network Notepad Professional Edition Help", available at https://web.archive.org/web/20180505045823/http://www.networknotepad.com:80/Pro1.3/EN/help.html, 18 pages, archived May 5, 2018.*

*Primary Examiner* — Matthew Ell
(74) *Attorney, Agent, or Firm* — Daly, Crowley, Mofford & Durkee, LLP

(57) ABSTRACT

Visualization of a topology of a network is provided. An aspect includes receiving, via a user interface, user-inputted device information for a first device. The first device has a first device type. An aspect also includes populating a map view window of a user interface screen with a graphical representation of the first device, and receiving, via the user interface, connector information for a user-inputted connector that connects the first device with a graphical representation of a second device in the map view window. The second device has a second device type that is different than the first device type. Upon receiving the connector information, an aspect further includes searching a database for device information for the second device, and validating, from the user-inputted device information of the first device and the device information of the second device, compatibility of the first device and the second device.

20 Claims, 5 Drawing Sheets

(56) References Cited

U.S. PATENT DOCUMENTS

2015/0363096 A1\* 12/2015 Carlozzi ................... G06F 8/34
                                                              715/735
2019/0268218 A1\* 8/2019 Thomasson ............. H04L 41/12

\* cited by examiner

VISUALIZATION OF NEW STORAGE AREA NETWORK DEVICES AND CONNECTIVITY WITH A TOPOLOGY BASED MAP

BACKGROUND

Storage area networks, such as those found in data centers, can be very complex and typically contain a large number of devices that work together to provide various functions and services to clients. As these networks grow in size and/or become modified due to changing needs and technologies, it becomes challenging to maintain them, as many of these devices are interdependent and must be compatible. For example, suppose an administrator who is responsible for a large data center that is comprised of hundreds of nodes is tasked with introducing new resources to the system. The administrator would need to ensure any new devices, prior to bringing them online to the network, are compatible with the system and are capable of interoperating with existing nodes, both upstream and downstream, in order to ensure a seamless transition and minimize any impact on the system's performance. With the increasing complexity of today's network systems and devices, managing such a task can be time consuming and labor intensive.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for visualizing a topology of a network. The method includes receiving, via a user interface, user-inputted device information for a first device. The first device has a first device type. The method also includes populating a map view window of a user interface screen with a graphical representation of the first device, and receiving, via the user interface, connector information for a user-inputted connector that connects the first device with a graphical representation of a second device in the map view window. The second device has a second device type that is different than the first device type. Upon receiving the connector information, the method includes searching a database for device information for the second device, and validating, from the user-inputted device information of the first device and the device information of the second device, compatibility of the first device and the second device. The validation determines interoperability between the first device and the second device.

Another aspect may provide a system for visualizing a topology of a network. The system includes a user interface, a memory having computer-executable instructions for implementing the user interface, and a processor. The processor executes the computer-executable instructions. When executed by the processor, the computer-executable instructions cause the processor to perform operations. The operations include receiving, via a user interface, user-inputted device information for a first device. The first device has a first device type. The operations also include populating a map view window of a user interface screen with a graphical representation of the first device, and receiving, via the user interface, connector information for a user-inputted connector that connects the first device with a graphical representation of a second device in the map view window. The second device has a second device type that is different than the first device type. Upon receiving the connector information, the operations further include searching a database for device information for the second device, and validating, from the user-inputted device information of the first device and the device information of the second device, compatibility of the first device and the second device. The validation determines interoperability between the first device and the second device. Another aspect may provide a computer device for visualizing a topology of a network. The computer device includes a user interface operable by the computer device. The computer device displays a user interface screen via the user interface. The user interface is configured to receive, via the user interface screen, user-inputted device information for a first device. The first device has a first device type. The user interface is also configured to populate a map view window of the user interface screen with a graphical representation of the first device and receive, via the user interface screen, connector information for a user-inputted connector. The connector connects the first device with a graphical representation of a second device in the map view window. the second device has a second device type that is different than the first device type. Upon receiving the connector information, the user interface is further configured to search, via the computer device, a database for device information for the second device and validate, from the user-inputted device information of the first device and the device information of the second device, compatibility of the first device and the second device including determining interoperability between the first device and the second device. Upon successful validation, the user interface is further configured to enable a topology view of the first device, the second device, and the connector via the map view window.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
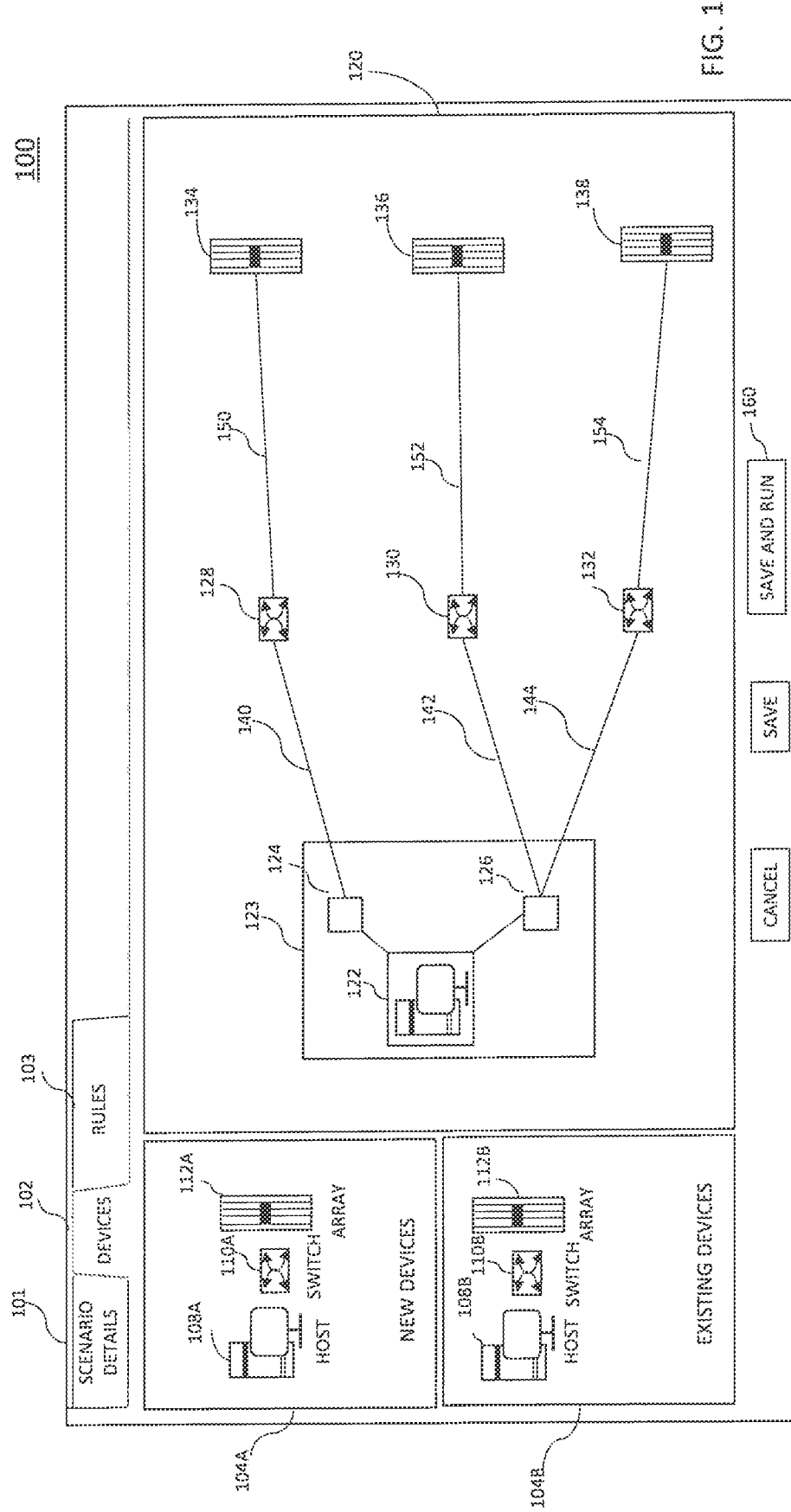
FIG. 1 is a user interface screen depicting a sample storage area network (SAN) configuration map generated by an administrator in accordance with an embodiment.

In order for an administrator or representative of a large network to ensure that any new devices, prior to bringing them online to a network, are compatible with the network system and are capable of interoperating with existing devices, the embodiments described herein provide a user interface-based tool for visualizing a storage area network (SAN) topology. The individual, through the user interface, can add connectivity among devices, and a backend system validates that the devices will work effectively with one another.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage area network" (SAN) may refer to a dedicated high-speed network for data storage (e.g., block-level network access to storage). A SAN may be comprised of hosts, switches, storage elements, and storage devices that are interconnected using various technologies, topologies, and protocols.

The term "data center" may refer to physical and/or virtual infrastructures that are used to house computer, server, and networking systems and provide storage, processing, and servicing of large amounts of data to clients.

In some embodiments, the term "storage device" may refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, a storage device may refer to any non-volatile memory (NVM) device, including hard disk drives (HDDs), solid state drives (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiment, a host system may refer to a networked computer that provides services to other systems and devices in the network. A switch may refer to a networking device that connects other devices (node-to-node) together in a network.

In certain embodiments, a topology may refer to an arrangement of a network including its nodes and connections.

In certain embodiments, storage resource management (SRM) may refer to one or more processes for optimizing the operation of a storage area network in terms of efficiency and speed with which drive space is utilized.

In certain embodiments a host bus adapter may refer to a device (e.g., an expansion card of a host system) that communicatively connects the host system to peripheral devices (e.g., network and storage devices) in a network.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data.

In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or Infiniband.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

In embodiments, a user interface-based tool for visualizing a storage area network (SAN) topology is provided herein. The user interface (UI)-based tool may be used by a data center administrator or other individual to visualize a new or desired data center device (e.g., host, switch, or array). The individual, through the user interface, can add connectivity among devices. These devices may be those which the individual is planning to introduce in the data center. As all or some devices may be new, this UI is configured to have the capability to generate the entire topology dataset which could be used to validate device interoperability with the system's support matrix data. With this, the administrator can validate devices that he/she intends to add along with existing inventory for its compliance. When a network configuration is successfully validated, the administrator is assured that the network devices, once online, will be compatible and work effectively. For those configurations in which validation was not successful, the administrator is notified of the nature of the compatibility issues (e.g., a selected array is incompatible with a selected switch) and the administrator can return to the user interface tool to reconfigure the network (e.g., select or add a different device to the network) prior to acquiring and installing the device in the network.

The UI is configured to enable a user to enter a data center device, add connectivity on a map view, and validate it to see if the device the user plans to introduce in the data center is compliant with the system's support matrix. By using this tool, the user can understand whether a new device will be compatible with an existing network system before the user actually acquires and connects the device to the data center's network.

Turning now to FIG. 1, a user interface screen 100 of an interface tool depicting a sample SAN configuration map will now be described in an embodiment. As shown in FIG. 1, three tabs "Scenario Details" 101, a "Devices" tab 102, and a "Rules" tab 103 are shown. The "Devices" tab 102 reveals two subwindows "New Devices" 104A and "Existing Devices" 104B. A new device refers to one that has not yet been used in the system and its information has not been entered into the system. For example, if it is a new model that has not yet been acquired and/or connected by the system, its corresponding information has not been entered into a database for the system. By contrast, an existing device refers to one in which its corresponding information has been entered into the database for the system. This database is described further herein. To add a new device, the user selects a type of device to add. As shown in FIG. 1, the device types for new and existing devices include host 108A/108B, switch 110A/110B, and array 112A/112B, respectively.

For purposes of illustration, it is assumed that the user selects "host" 108A as the device type to add. This can be performed, e.g., by dragging and dropping the corresponding icon in the maps view, as shown in a window 120. Alternatively, the user may click on the corresponding icon in, e.g., the subwindow 104A using a mouse or other input device and the tool automatically populates the icon in the maps view of window 120.

Figure 2:
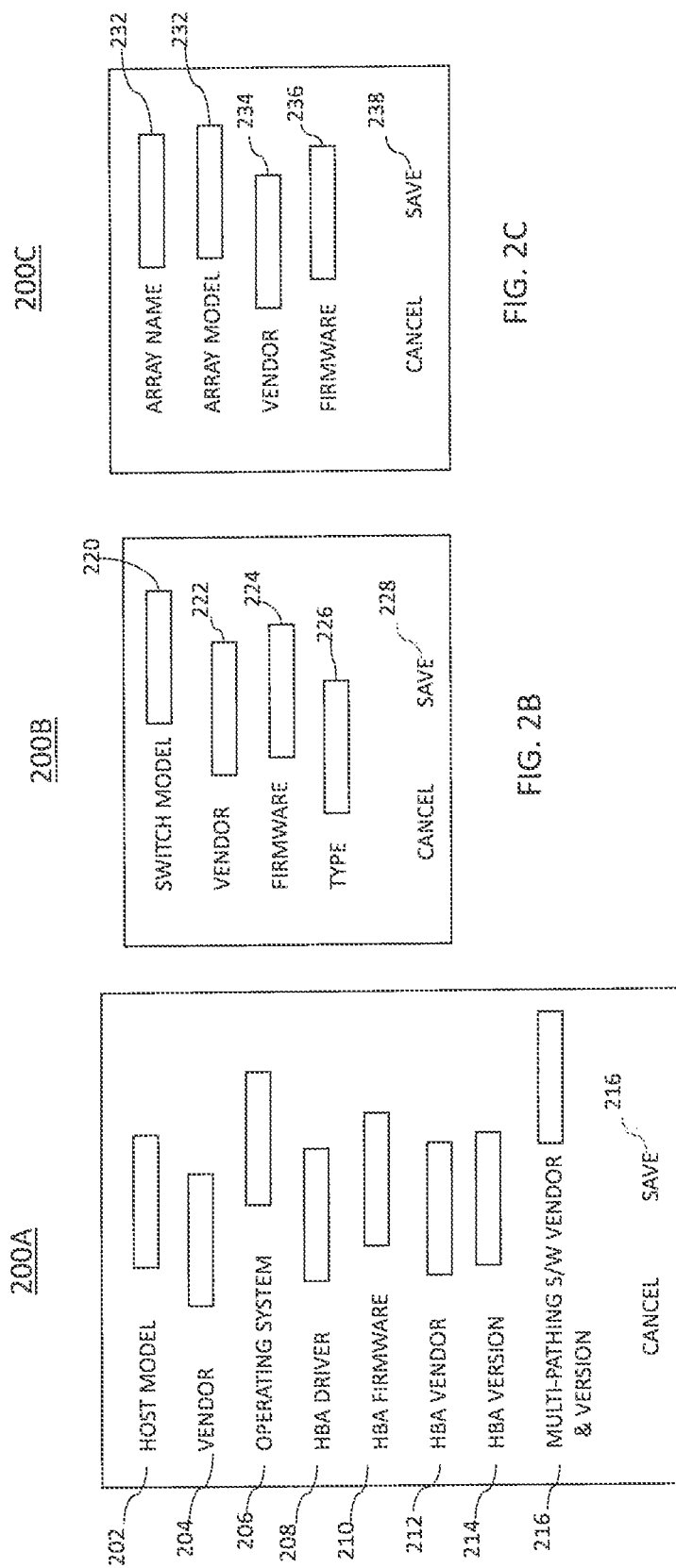
FIG. 2A is a user interface screen window for collecting device information for a new device in accordance with an embodiment.
FIG. 2B is a user interface screen window for collecting switch information for a new switch in accordance with an embodiment.
FIG. 2C is a user interface window for collecting array information for a new array in accordance with an embodiment.

Once a new device has been selected, the UI tool presents a popup window 200A, as shown in FIG. 2A, to enable the user to enter information about the device. For example, the information to be collected for a new host device may include host model 202, vendor 204, operating system (OS) 206, host bus adapter (HBA) driver 208, HBA firmware 210, HBA vendor 212, HBA version 214, and multi-pathing software vendor and version 216, as shown in FIG. 2A. The popup window 200A prompts the user to enter this information. It will be understood that the user may further enter multiple HBA data for the new host device with details. Once the information is completed, the user selects a save option 216, and the information is stored in the backend database, which is described further herein.

If the user selects an existing device to add to the network, a popup window (not shown) is presented via the user interface which provides the information previously stored about the devices of the selected device type. For example, the user can select an existing device type (e.g., one of host 108B, 110B, and 112B from subwindow 104B) from the UI of FIG. 1. The popup window for the selection may include a listing of all available devices corresponding to that device type, as well as other related descriptive information. For example, upon selecting the device type host, a listing of all available host devices that have been stored in the system may be listed for selection by the user.

An icon representing the new or existing host device (e.g., host device 122) will appear in the maps view window 120. As shown in FIG. 1, e.g., a host device 122 is shown in a grouping 123 along with corresponding HBA drivers 124 and 126.

Once a new or existing host device (e.g., host device 122) has been selected and populated in the maps view of window 120, the user may add a switch to which he/she intends to connect the host device. Similar to the host device selection, the user may either select to add a new switch (from subwindow 104A) or an existing switch (from subwindow 104B). A popup window 200B of FIG. 2B is presented for the new switch and the user is prompted to enter a switch model 220, vendor 222, firmware 224, and other related information. For example, a switch type field 226 may be provided in which the user may select a type of switch (e.g., fabric switch). The user may choose one or more new switches from the user interface screen 100 simply by returning to the switch icon. Once completed, the user selects a save option 228 from the window 200B.

Alternatively, the user may select an existing switch, e.g., by dragging and dropping the switch icon 110B from the subwindow 104B into the maps view window 120, in which instance the user is presented with a list (not shown) of pre-discovered switches (e.g., those in which descriptive information, such as switch model and firmware, that have been captured and stored in the system database). The user can choose one or more existing switches from the list.

Once the new or existing switch or switches have been completed, the selected switch(es) appear in the maps view window 120 of the UI screen. As shown, e.g., in FIG. 1, switches 128, 130, and 132 have been selected by the user and populated into the maps view window 120.

The user may further add an array from new or existing devices from the corresponding subwindows 104A and 104B. Similar to the host and switch process, the user can add a new array or an existing array. In the case of an existing array, only those which have physical connectivity to the switch that has been added to the maps view window 120 will be shown in the resulting list (not shown) presented to the user (e.g., the popup window presented once the array has been selected). This process of associating physical connectivity between arrays and switches is managed by the backend system as will be described further herein.

If the user selects a new array from the subwindow 104A, a window 200C is presented as shown in FIG. 2C. As shown in FIG. 2C, the user is presented with fields for entering information about the new array. The user may select a name 230 for the array, as well as a model 232, a vendor 234, and firmware 236. Once completed, the user selects a save option 238, the array information is saved to the backend system, and an array icon representing the new array is presented in the maps view window 120. As shown, e.g., in FIG. 1, arrays 134, 136, and 138 have been selected.

In the event any two neighboring devices are chosen from an existing device, connectivity will be pre-populated between them if physically connected. Otherwise, the user will need to manually connect the device in the topology map view. Connectivity will be restricted only between these components, for example:

HBA—Switch or Switch—HBA

Switch—Array or Array—Switch

For instance, if a switch and an array are selected from existing devices, if they are connected in an actual data center, then the switch and array will be connected automatically in the map. Thus, the user need not draw a connection within the map view window.

Once the devices have been selected and added to the maps view window 120, the user may add connectivity among the devices. To add connectivity between an HBA and a switch, the user first selects the HBA to which he/she intends to add connectivity, e.g., keeping the left button of the mouse pressed and dragging the pointer until reaching the switch he/she intends to connect it to. A line will be drawn between the HBA and switch representing connectivity. This line is referred to as a connector. This technique could be used between other components to achieve connectivity. As shown in FIG. 1, HBA 124 is connected to switch 128 via connector 140, HBA 126 is connected to switch 130 via connector 142, and HBA 126 is also connected to another switch 132 via connector 144. In addition, switch 128 is connected to array 134 via a connector 150, switch 130 is connected to array 136 via connector 152, and switch 132 is connected to array 138 via connector 154.

There may be no restriction placed on the number of devices that can be added to the map of window 120. The user may add multiple host/switch/array combinations. As long as the user adds connectivity between these devices, they will not be treated as neighboring devices and will not be considered for interoperability validation.

Once the user adds all the devices and corresponding connectivity in the map of window 120, data is sent to the backend system where the applicable rules are validated to check the compatibility between them. In an embodiment, the user selects a Save and Run option 160 from the user interface screen 100 and the information entered into the maps view window 120 is sent to the backend system where a validity check is performed, as will be described further herein.

The above-described network configuration is presented for illustrative purposes and is not intended to be limiting in scope. The UI tool may be used to build existing, stored SAN topologies, e.g., a user retrieves an existing topology from storage, which may or may not be actively used in a physical SAN network and may add or change one or more devices or connections. In addition, the arrangement and selection of the devices may occur in different order. For example, a user may first select an array to add to a new SAN topology, followed by a host and switch.

Figure 3:
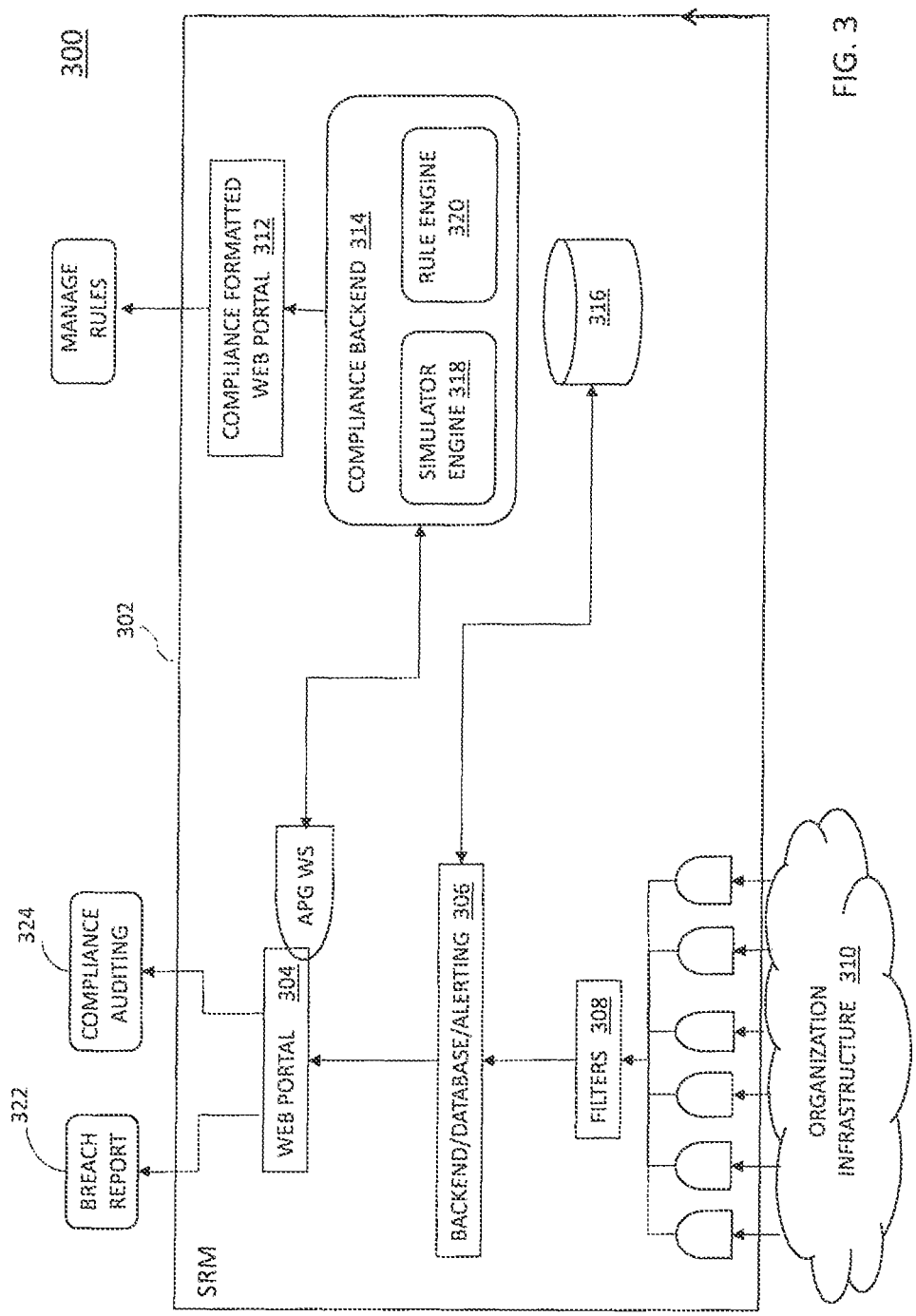
FIG. 3 is a high-level view of a system architecture for enabling visualization of a SAN configuration in accordance with an embodiment.

Turning now to FIG. 3, a system architecture 300 for simulating and visualizing a network topology will now be described in an embodiment. The system architecture 300 includes a storage resource management (SRM) tool 302 that is operable via a computer system (e.g., the computer system shown in FIG. 5). The SRM tool 302 includes a web portal 304, a backend system 306, and filters 308, which are configured for use via a business or organizational infrastructure 310.

The SRM tool 302 further includes a compliance frontend 312, which may be a web-based service, a compliance backend 314, and a database 316. The compliance backend includes a simulator engine 318 and a rule engine 320.

The SRM tool 302 performs the features and functions of the UI tool described above, in addition to providing other services. Users of the UI tool may access the UI features through the web portal 304 and enter information for new devices.

The UI tool enables users to simulate or perform hypothetical network configurations for a SAN by entering device information and desired connectivity among devices and receive real-time validation regarding interoperability and capability of the hypothetical configurations before the devices are brought online or are physically connected. These features are enabled via the compliance backend 314, simulator engine 318, rule engine 320, and database 316, which database stores user simulations and topologies.

The UI tool further allows users to visualize the hypothetical network configurations in a map view via a UI screen. The UI tool engages rules of compatibility and interoperability among devices and connections and uses these rules, e.g., to filter out incompatible devices/connections while the user is performing the hypothetical configurations via the UI tool. For instance, if the user selects an existing switch in the configuration, only those arrays which have physical connectivity to the existing switch will be presented in the resulting list to the user. Likewise, while the rules allow the user to create connectivity among compatible devices, the rules will prevent the user from rendering connectivity among devices that are incompatible within the topology map. The rules are applied via the compliance backend 314 to the backend system database 306, which stores the device information collected from the UI tool via FIGS. 1 and 2A-2C.

The UI tool applies the rules and filters 308 to the information collected from the user via the user interface described above and provides user feedback regarding system compatibility. Other feedback provided may include breach reports 322 and compliance audits 324.

Figure 4:
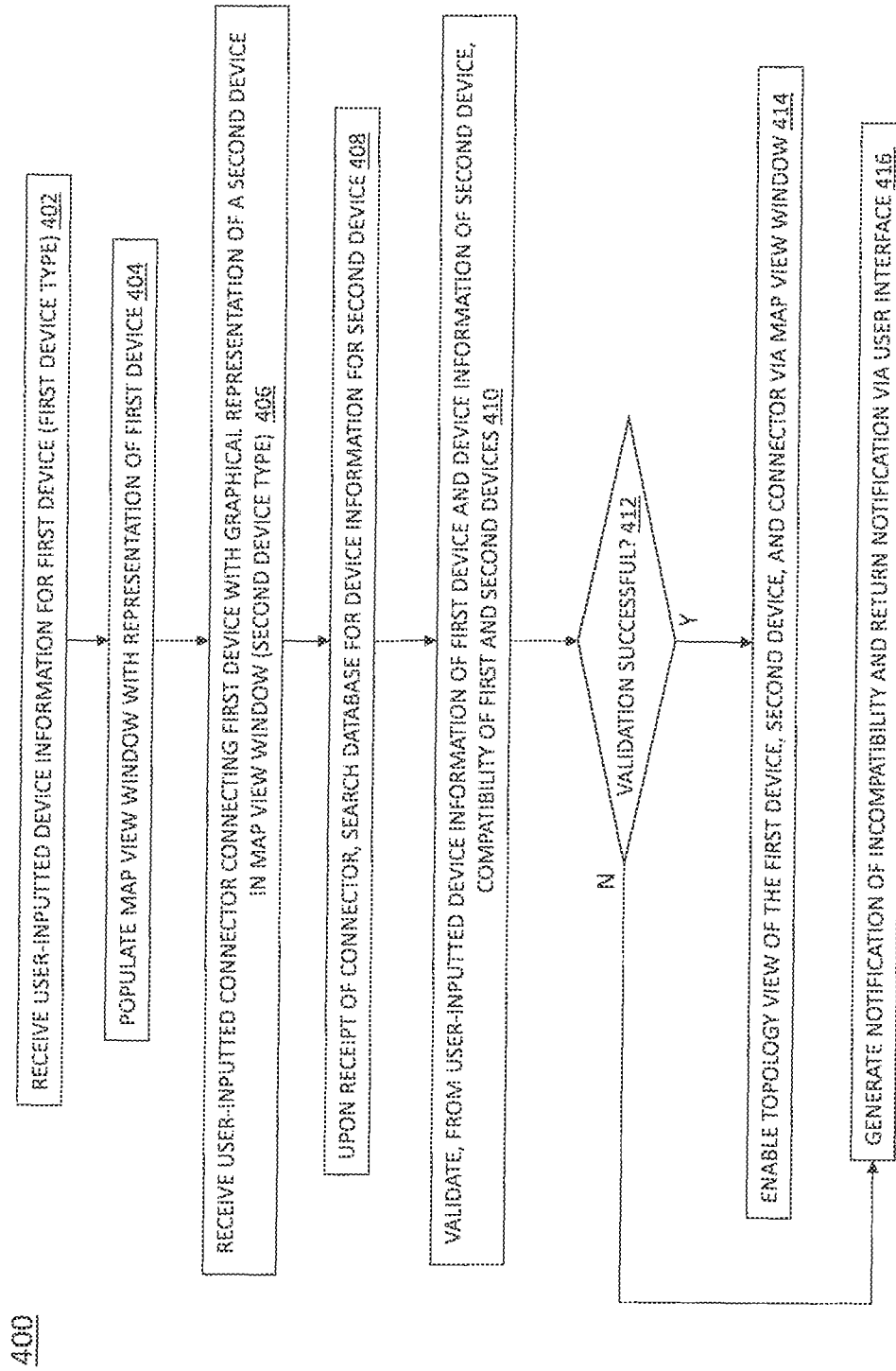
FIG. 4 is a flow diagram describing a process for simulating a SAN configuration via the UI of FIG. 1 in accordance with an embodiment.

Turning now to FIG. 4, a flow diagram of a process 400 for simulating and visualizing a network will now be described. For purposes of illustration, the process 400 assumes that the user creates a new (first) device for admission into the topology, and a second device already exists in the network.

In block 402, the user interface receives user-inputted device information for the first device. The first device has a first device type. For example, the device may be a host system, a switch, or an array.

In block 404, a map view window of a user interface screen is populated with a graphical representation of the first device.

In block 406, the user interface receives connection information defined by a user-inputted connector that is placed between two devices. The connector refers to a line that is drawn by the user between the devices within the user interface window 100. The line placement on the screen 100 tells the system which two devices are to be evaluated for compatibility. Thus, the user interface receives the user-inputted connector connecting the first device with a graphical representation of the second device in the map view window. The second device has a second device type that is different than the first device type. By way of non-limiting example, the first device type may be a host system and the second device type may be a switch. Alternatively, in another example, the first device type may be an array and the second device type may be a switch.

In block 408, upon receiving the connector, a database is searched for device information for the second device. As indicated above, the existing device information is stored in a backend system and is retrieved in block 408.

In block 410, the user-inputted device information of the first device and the device information of the second device is used to validate the compatibility of the first device and the second device (i.e., to determine interoperability between the first device and the second device).

In block 412, it is determined whether the validating is successful. If so, in block 414, the user interface enables a topology view of the first device, the second device, and the connector via the map view window (e.g., as shown in FIG.

1). Otherwise, if the validation is not successful, this means the two devices are not compatible. In this situation, the user interface generates notification of incompatibility and returns the notification via the user interface at block 416. If unsuccessful, the user can return to the user interface screen and select a different device and/or connection to validate. Upon a successful validation, the user may store the completed topology in the system.

As indicated above, when a device type is selected by the user from the New Devices subwindow, this means the device is not yet physically connected in the network. When a device type is selected from the Existing Devices subwindow, this means that the device is either physically connected in the network or the device information for that device already exists in the system.

Figure 5:
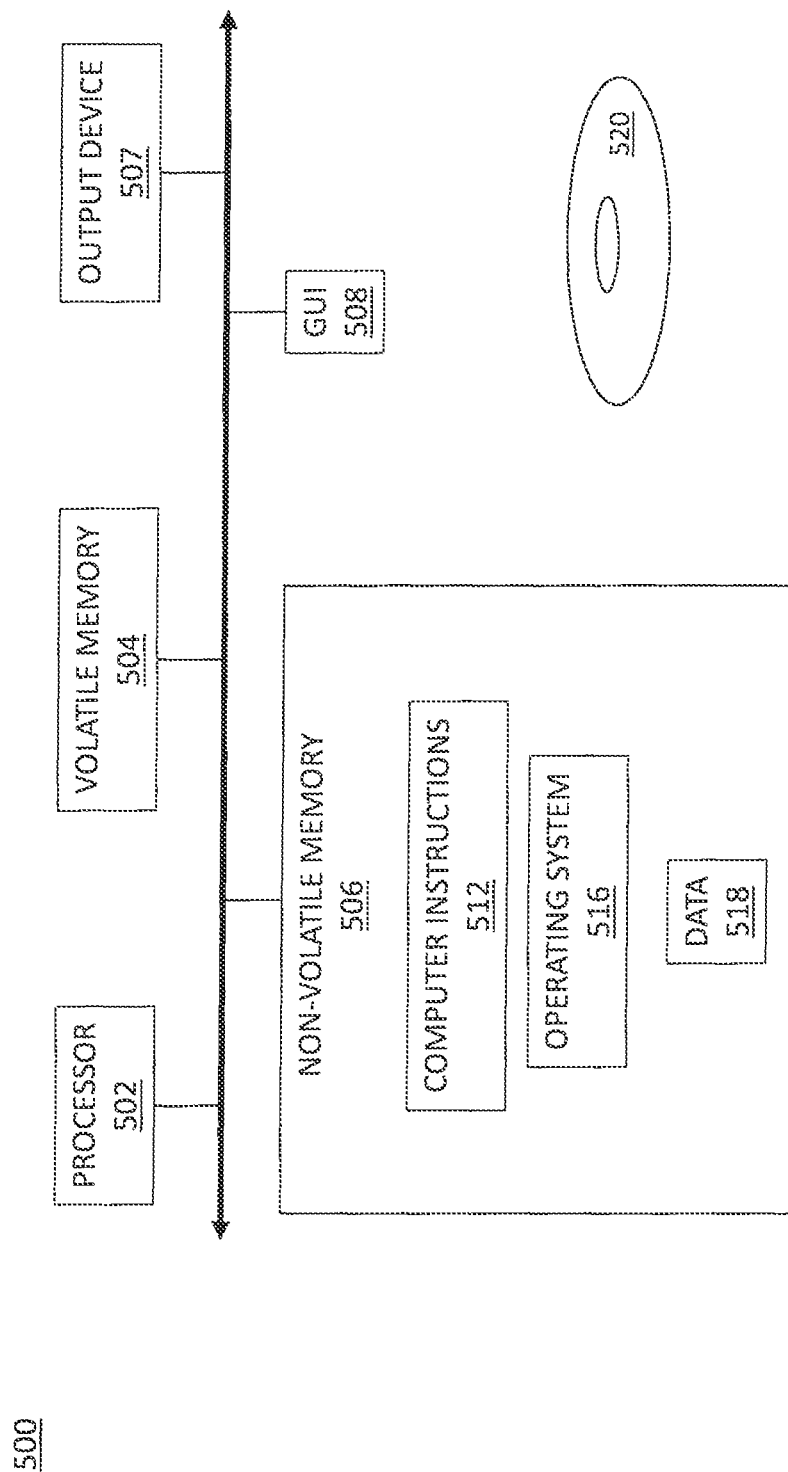
FIG. 5 is an example system that can perform at least a portion of the processing described herein.

FIG. 5 shows an exemplary computer 500 (e.g., physical or virtual) that can perform at least part of the processing described herein. The computer 500 includes a processor 502, a volatile memory 504, a non-volatile memory 506 (e.g., hard disk or flash), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. The computer instructions perform the functions of the user interface described in FIGS. 1-4. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for visualizing a topology of a network for a data center, comprising:
    providing, via a user interface, a first subwindow that lists a set of devices that are not physically present in the data center and are unconnected to the network;
    providing, via the user interface, a second subwindow that lists a set of devices that are physically present in the data center;
    receiving, via the first subwindow in the user interface, user-inputted device information for a first device, the first device having a first device type;
    populating a map view window of a user interface screen with a graphical representation of the first device;
    receiving, via the second subwindow, user-inputted information for a second device, the second device having a second device type that is different than the first device type;
    receiving, via the user interface, connector information for a user-inputted connector, the connector connecting the first device with a graphical representation of the second device in the map view window;
    upon receiving the connector information, searching a database for device information for the second device; and
    validating, from the user-inputted device information of the first device and the device information of the second device, compatibility of the first device and the second device including determining interoperability between the first device and the second device;
    wherein the first subwindow and the second subwindow list varying device types including the first device type and the second device type.

2. The method of claim 1, further comprising:
    upon successful validation, enabling a topology view of the first device, the second device, and the connector via the map view window.

3. The method of claim 1, further comprising:
    upon determining, from the validating, the first device and the second device are not compatible, generating notification of incompatibility and returning the notification via the user interface;
    wherein the user interface reconfigures the topology of the network represented via the user interface screen to include a new user-inputted device or connector.

4. The method of claim 1, wherein the second device is an existing device that is physically connected to the network.

5. The method of claim 1, wherein the network comprises a storage area network, wherein:

the first device type comprises one of a host system, a switch, and an array; and the second device type comprises one of a host system, a switch, and an array.

6. The method of claim 1, wherein the second device is an existing device that is not communicatively coupled to the network, the method further comprising:

populating the map view window of the user interface screen with the graphical representation of the second device prior to receiving the connector.

7. The method of claim 1, wherein the second device is physically connected in the network, the method further comprising:

receiving a user-selected device type for the second device from the second subwindow via the user interface screen; and displaying a window having a list of devices corresponding to the user-selected device type, wherein the second device is populated into the map view window in response to selection by the user of the second device from the list of devices.

8. The method of claim 1, wherein the first device is a new device.

9. A system for visualizing a topology of a network for a data center, comprising:

a user interface;

a memory comprising computer-executable instructions for implementing the user interface; and a processor executing the computer-executable instructions, the computer-executable instructions when executed by the processor cause the processor to perform operations comprising:

providing, via the user interface, a first subwindow that lists a set of devices that are not physically present in the data center and are unconnected to the network;

providing, via the user interface, a second subwindow that lists a set of device types corresponding to devices that are physically present in the data center;

receiving, via the first subwindow in the user interface, user-inputted device information for a first device, the first device having a first device type;

populating a map view window of a user interface screen with a graphical representation of the first device;

receiving, via the second subwindow, user-inputted information for a second device, the second device having a second device type that is different than the first device type;

receiving, via the user interface, connector information for a user-inputted connector, the connector connecting the first device with a graphical representation of the second device in the map view window;

upon receiving the connector information, searching a database for device information for the second device; and validating, from the user-inputted device information of the first device and the device information of the second device, compatibility of the first device and the second device including determining interoperability between the first device and the second device;

wherein the first subwindow and the second subwindow list varying device types including the first device type and the second device type.

10. The system of claim 9, wherein the operations further comprise:

upon successful validation, enabling a topology view of the first device, the second device, and the connector via the map view window.

11. The system of claim 9, wherein the operations further comprise:

upon determining, from the validating, the first device and the second device are not compatible, generating notification of incompatibility and returning the notification via the user interface;

wherein the topology of the network represented via the user interface screen is reconfigured to include a new user-inputted device or connector.

12. The system of claim 9, wherein the second device is an existing device that is physically connected to the network.

13. The system of claim 9, wherein the first device is populated into the map view window by a user of the user interface via a drag and drop function.

14. The system of claim 9, wherein the network comprises a storage area network, wherein:

the first device type comprises one of a host system, a switch, and an array; and the second device type comprises one of a host system, a switch, and an array.

15. The system of claim 9, wherein the second device is an existing device that is not communicatively coupled to the network, the operations further comprising:

populating the map view window of the user interface screen with the graphical representation of the second device prior to receiving the connector.

16. The system of claim 9, wherein the second device is physically connected in the network, the operations further comprising:

receiving a user-selected device type for the second device from the second subwindow via the user interface screen; and displaying a window having a list of devices corresponding to the user-selected device type, wherein the second device is populated into the map view window in response to selection by the user of the second device from the list of devices.

17. A computer device for visualizing a topology of a network for a data center, comprising:

a user interface operable by a processor of the computer device, wherein the computer device displays a user interface screen via the user interface, the user interface configured for:

providing a first subwindow that lists a set of devices that are not physically present in the data center and are unconnected to the network;

providing a second subwindow that lists a set of devices that are physically present in the data center;

receiving, via the first subwindow, user-inputted device information for a first device, the first device having a first device type;

populating a map view window of the user interface screen with a graphical representation of the first device;

receiving, via the second subwindow, user-inputted information for a second device, the second device having a second device type that is different than the first device type;

receiving, via the user interface screen, connector information for a user-inputted connector, the connector connecting the first device with a graphical representation of the second device in the map view window;

upon receiving the connector information, searching, via the computer device, a database for device information for the second device;

validating, from the user-inputted device information of the first device and the device information of the second device, compatibility of the first device and the second device including determining interoperability between the first device and the second device; and upon successful validation, enabling a topology view of the first device, the second device, and the connector via the map view window;

wherein the first subwindow and the second subwindow list varying device types including the first device type and the second device type.

18. The computer device of claim 17, wherein the user interface is further configured for:

upon determining, from the validating, the first device and the second device are not compatible, generating notification of incompatibility and returning the notification via the user interface;

wherein the topology of the network represented via the user interface screen is reconfigured to include a new user-inputted device or connector.

19. The computer device of claim 17, wherein:

the first device type is one of a host system, a switch and an array, and the second device type is one of a host system, a switch, and an array; and the first device is populated into the map view window by a user of the user interface via a drag and drop function.

20. The computer device of claim 17, wherein the second device is physically connected in the network, the user interface further configured for:

receiving a user-selected device type for the second device from the second subwindow via the user interface screen; and displaying a window having a list of devices corresponding to the user-selected device type, wherein the second device is populated into the map view window in response to selection by the user of the second device from the list of devices.

* * * * *